(12) United States Patent
Kang (10) Patent No.: US 11,815,162 B2
(45) Date of Patent: Nov. 14, 2023

(54) REDUCER

(71) Applicant: MINTROBOT CO.,LTD., Daejeon (KR)

(72) Inventor: Hyeong Seok Kang, Seoul (KR)

(73) Assignee: MINTROBOT CO., LTD., Daejeon (KR)

( * ) Notice: Subject to any disclaimer, the term of this patent is extended or adjusted under 35 U.S.C. 154(b) by 0 days.

(21) Appl. No.: 17/896,577

(22) Filed: Aug. 26, 2022

(65) Prior Publication Data

US 2023/0097445 A1 Mar. 30, 2023

(30) Foreign Application Priority Data

Sep. 28, 2021 (KR) .......................... 10-2021-0128167

(51) Int. Cl.
*F16H 1/32* (2006.01)
*F16H 57/08* (2006.01)

(52) U.S. Cl.
CPC .............. *F16H 1/32* (2013.01); *F16H 57/08* (2013.01); *F16H 2001/325* (2013.01); *F16H 2001/328* (2013.01)

(58) Field of Classification Search
CPC . F16H 2001/325; F16H 1/32; F16H 2001/328
(Continued)

(56) References Cited

U.S. PATENT DOCUMENTS 1,767,866 A * 6/1930 Wildhaber ............... F16H 1/32
475/181

4,567,790 A * 2/1986 Butterfield ............... F16H 1/32
475/179

(Continued)

FOREIGN PATENT DOCUMENTS

DE 112018007606 T5 * 2/2021 ............... F16D 3/04
EP 0444790 A2 * 9/1991
(Continued)

OTHER PUBLICATIONS

Non-final office action dated Dec. 22, 2021 from the Korean Patent Office for Korean Application No. 10-2021-0128167.
(Continued)

*Primary Examiner* — Sherry L Estremsky
(74) *Attorney, Agent, or Firm* — INSIGHT LAW GROUP, PLLC; Seung Lee (57) ABSTRACT

A reducer includes a reduction unit configured to reduce an input torque, and an output unit configured to be supplied with a preset reduction torque through the reduction unit and to transfer an output torque to the outside. The reduction unit includes an input shaft configured to be supplied with the input torque, a cycloidal disc arranged on an outer circumferential surface of the input shaft in an eccentrically rotatable manner, a tooth-type protrusion being formed along a circumference of an edge of the cycloidal disc, a hollow housing configured to accommodate the cycloidal disc and including a plurality of inner pins arranged to be spaced a predetermined distance apart from each other along a circumference of an inner circumferential surface of the hollow housing in a manner that possibly comes into contact with the tooth-type protrusion on the cycloidal disc, and a plurality of rolling pins coupled to the cycloidal disc and having a cylindrical structure.

8 Claims, 10 Drawing Sheets

(58) Field of Classification Search
USPC .......................................................... 475/179
See application file for complete search history.

(56) References Cited

U.S. PATENT DOCUMENTS

| | | | | |
|---|---|---|---|---|
| 5,683,323 A | * | 11/1997 | Imase | F16H 1/32 |
| | | | | 475/168 |
| 6,450,913 B1 | * | 9/2002 | Strowik | B60N 2/0224 |
| | | | | 475/179 |
| 9,732,845 B2 | * | 8/2017 | Shinkai | H02K 7/116 |
| 10,557,523 B2 | * | 2/2020 | Honda | F16H 1/32 |
| 10,591,031 B2 | * | 3/2020 | Uematsu | F16H 61/12 |
| 2021/0364046 A1 | * | 11/2021 | Kernbaum | F16D 3/48 |

FOREIGN PATENT DOCUMENTS

| | | | |
|---|---|---|---|
| FR | 1332135 A | * | 12/1963 |
| JP | 6893458 B2 | | 4/2019 |
| JP | 6567204 B2 | | 8/2019 |
| JP | 2020-076477 A | | 5/2020 |
| KR | 10-1855712 B1 | | 5/2018 |

OTHER PUBLICATIONS

Notice of allowance dated Apr. 4, 2022 from the Korean Patent Office for Korean Application No. 10-2021-0128167.

\* cited by examiner

REDUCER

CROSS REFERENCE TO RELATED APPLICATION

The present application claims priority of Korean Patent Application No. 10-2021-0128167 filed on Sep. 28, 2021, the entire contents of which is incorporated herein for all purposes by this reference.

BACKGROUND OF THE DISCLOSURE

Field of the Disclosure

The present disclosure relates to a reducer and, more particularly to, a reducer in which a rolling pin is rotated and eccentric rotation is performed at the rotor side of an output unit.

Description of the Related Art

Industrial robots employ a joint structure in which a multiplicity of joints has the freedom of motion. The motion is provided to a joint through an actuator motor, a servo motor, and the like. In a usual configuration of a robot joint, a reducer is installed on an output terminal of a servo motor to obtain a high-output torque from the servo motor or the like.

The industrial robots employ a harmonic drive technique or a cycloidal drive technique for full or partial reduction of robot motion. Of these, the cycloidal drive technique is used in various ways in various industrial fields. In a structure to which the cycloidal drive technique is applied, a cycloidal disc is rotated with external teeth thereof being engaged with internal teeth of an output shaft. Accordingly, rotational power of an input shaft is reduced, and thus the reduced rotational power is transferred to the output shaft. Through this structure, a great torque is made transferable, and a configuration where a reduction ratio is increased can be employed.

In a cycloidal reducer, the cycloidal disc is rotated together according to rotation of an input shaft, and a plurality of rotor pins coupled to the cycloidal disc transfer a reduction torque to an output shaft. Various methods in which an eccentric motion is converted into a concentric motion in order to transfer the reduction torque are selected for use. In the related art, the eccentric motion is converted into the concentric motion by inserting a cam roller into a disc or by using a biaxial motion structure, such as Oldham coupling, and the resulting concentric motion is transferred.

However, reducers are difficult to manufacture using a technique of inserting the cam roller into the disc. Therefore, there is a demand in the industrial field for reducers that are capable of stably transferring the reduction torque to the output shaft while increasing the ease of manufacturing.

Document of Related Art

[Patent Document] (Patent Document) Korean Patent No. 10-1855712 B1

SUMMARY OF THE DISCLOSURE

An object of the present disclosure, which is made to solve the above-mentioned problem, is to provide a reducer that is capable of improving the ease of assembling using concentric rolling pins instead of eccentric pins.

Another object of the present disclosure is to provide a reducer that is capable of pre-pressing against load support bearings toward the outside using a fixation pin or pre-pressing against the load support bearings toward the inside using a fastening means.

The present disclosure is not limited to the above-mentioned objects, and, from the following description, an object not mentioned above would be definitely understandable to a person of ordinary skill in the art.

In order to accomplish the above-mentioned objects, according to an aspect of the present disclosure, there is provided a reducer including: a reduction unit configured to reduce an input torque; and an output unit configured to be supplied with a preset reduction torque through the reduction unit and to transfer an output torque to the outside, wherein the reduction unit includes: an input shaft configured to be supplied with the input torque; a cycloidal disc arranged on an outer circumferential surface of the input shaft in an eccentrically rotatable manner, a tooth-type protrusion being formed along a circumference of an edge of the cycloidal disc; a hollow housing configured to accommodate the cycloidal disc and including a plurality of inner pins arranged to be spaced a predetermined distance apart from each other along a circumference of an inner circumferential surface of the hollow housing in a manner that possibly comes into contact with the tooth-type protrusion on the cycloidal disc; and a plurality of rolling pins coupled to the cycloidal disc and having a concentrically shaped cylindrical structure, wherein the output unit includes: an output rotor configured to accommodate the rolling pins and to transfer the reduction torque transferred from the rolling pins to the outside; and wherein the rolling pins are eccentrically moved relatively to the output rotor.

In the reducer, the rolling pins may be rotated according to rotation of the cycloidal disc.

In the reducer, the cycloidal disc may include: a first hollow space formed in the center of the cycloidal disc in such a manner as to have an opening at both sides in order to accommodate the input shaft; and a plurality of second hollow spaces formed to be spaced a predetermined angle apart from each other with respect to the first hollow space in such a manner as to have an opening at both sides, wherein the rolling pins are inserted into at least several, respectively, of the second hollow spaces.

The reducer may further include a plurality of fixation pins inserted into several other, respectively, of the second hollow spaces into which the rolling pins are not inserted.

In the reducer, the rolling pins and the fixation pins may be alternately inserted into the second hollow spaces.

In the reducer, the output rotor may include: a plurality of first rolling pin accommodation grooves formed by recessing the output rotor by a predetermined depth in a lengthwise direction of the rolling pins in order to accommodate the rolling pins; and a plurality of first fixation pin accommodation grooves formed by recessing the output rotor by a predetermined depth in a lengthwise direction of the fixation pins in order to accommodate the fixation pins, wherein each of the first fixation pin accommodation grooves may have a diameter corresponding to a diameter of each of the fixation pins.

The reducer may further include a balancing unit formed in such a manner as to face the output unit with the reduction unit in between and configured to cancel out a twisting moment of the reduction torque that occurs when the cycloidal disc is rotated, wherein the balancing unit may include a balancing rotor formed in such a manner as to face the output rotor and configured to accommodate the rolling pins.

In the reducer, the balancing rotor may include: a plurality of second rolling pin accommodation grooves formed by recessing the balancing rotor by a predetermined depth in a lengthwise direction of the rolling pins in order to accommodate the rolling pins; and a plurality of second fixation pin accommodation grooves formed by recessing the balancing rotor by a predetermined depth in a lengthwise direction of the fixation pins in order to accommodate the fixation pins, wherein the output rotor and the balancing rotor may be coupled to first end portions and second end portions, respectively, of the fixation pins, and thus the output rotor and the balancing rotor may be rotated together in conjunction with each other.

In the reducer, the fixation pins may press against the output rotor and the balancing rotor toward the outside, thereby pre-pressing against a first load support bearing configured to cover one portion of an outer circumferential surface of the output rotor and a second load support bearing configured to cover one portion of an outer circumferential surface of the balancing rotor toward the outside.

In the reducer, the balancing rotor may include: a plurality of second rolling pin accommodation grooves formed by recessing the balancing rotor by a predetermined depth in a lengthwise direction of the rolling pins in order to accommodate the rolling pins; and a plurality of second fixation pin accommodation grooves formed by recessing the balancing rotor by a predetermined depth in a lengthwise direction of the fixation pins in order to accommodate the fixation pins that each have a hollow structure, wherein the output rotor and the balancing rotor may be coupled to each other by a plurality of fastening means which are inserted into the fixation pins, respectively, for being coupled thereto, and thus the output rotor and the balancing rotor may be rotated together in conjunction with each other.

In the reducer, the plurality of fastening means may press against the output rotor and the balancing rotor toward the inside, thereby pre-pressing against a first load support bearing configured to cover one portion of an outer circumferential surface of the output rotor and a second load support bearing configured to cover one portion of an outer circumferential surface of the balancing rotor toward the inside.

As described in detail below, the reducer according to the present disclosure uses the concentric rolling pins. Thus, the advantage of improving the ease of assembling the reducer is provided.

In addition, the output rotor and the balancing rotor are arranged in such a manner as to face each other with the cycloidal disc in between. Thus, the advantage of minimizing a twisting moment due to a torque transferred through the rolling pins when the cycloidal disc is rotated is provided.

In addition, the plurality of fixation pins or the plurality of fastening means are formed to be spaced a predetermined angle apart from each other in order to fix the output rotor and the balancing rotor, and are configured to pre-press against the load support bearing toward the outside or toward the inside. Thus, the advantage of maintaining a stable assembled state of the reducer and stably operating the reducer is provided.

DETAILED DESCRIPTION OF THE DISCLOSURE

Embodiments of the present disclosure will be described in detail below referring to the drawings. It should be noted that the same constituent elements, although illustrated in different drawings, are given the same reference character, if possible, throughout the drawings. In addition, specific descriptions of a well-known configuration and function associated with the embodiments of the present disclosure will be omitted when determined as making the embodiments of the present disclosure difficult to understand.

The terms first, second, and so forth, the letters A, B, and so forth, and the letters in parentheses (a), (b), and so forth may be used to describe constituent elements according to each of the embodiments of the present disclosure. These terms and letters are used only to distinguish among the same constituent elements, and do not impose any limitation on the natures of the same constituent elements or the order thereof. In addition, unless otherwise defined, all terms, including technical or scientific terms, which are used in the present specification, have the same meanings as are normally understood by a person of ordinary skill in the art to which the present disclosure pertains. The term as defined in a dictionary in general use should be construed as having the same meaning as interpreted in context in the relevant technology, and, unless otherwise explicitly defined in the present application, is not construed as having an ideal meaning or an excessively-formal meaning.

A reducer 1 according to a first embodiment of the present disclosure will be described below.

Figure 1:
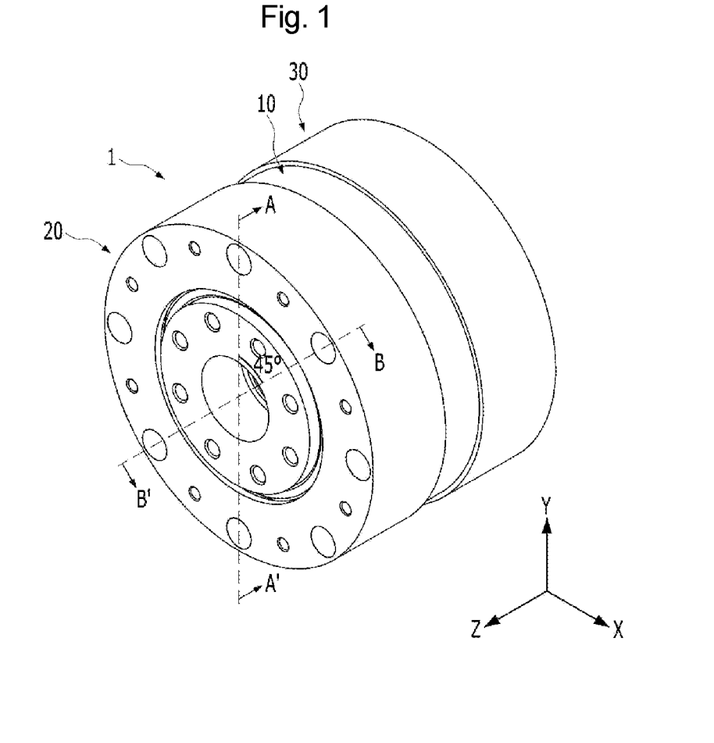
FIG. 1 is a view illustrating a reducer according to a first embodiment of the present disclosure.

FIG. 1 is a view illustrating the reducer 1 according to the first embodiment of the present disclosure.

Referring to FIG. 1, the reducer 1 includes a reduction unit 10, an output unit 20, and a balancing unit 30. The reduction unit 10 reduces an input torque that is input into the reduction unit 10. As an example, with a structure for tooth engagement caused by disc rotation, the reduction unit 10 may convert the input torque into a reduction torque. The output unit 20 may be supplied with the (preset) reduction torque resulting from the conversion by the reduction unit 10 and may transfer an output torque to the outside. An internal configuration of the reducer 1 may be suitably changed in order to acquire a necessary torque and transfer the acquired torque to the outside. The reduction unit 10 and the output unit 20 may be coupled to each other along the same axial line direction. As an example, the reduction unit 10 and the output unit 20 may be coupled to each other along a direction in parallel to the Z-axis. In addition, the balancing unit 30 may minimize a twisting moment that may occur when the reduction torque resulting from the conversion by the reduction unit 10 is transferred to the output unit 20.

Constituent elements of the reduction unit 10 will be described below.

Figure 2:
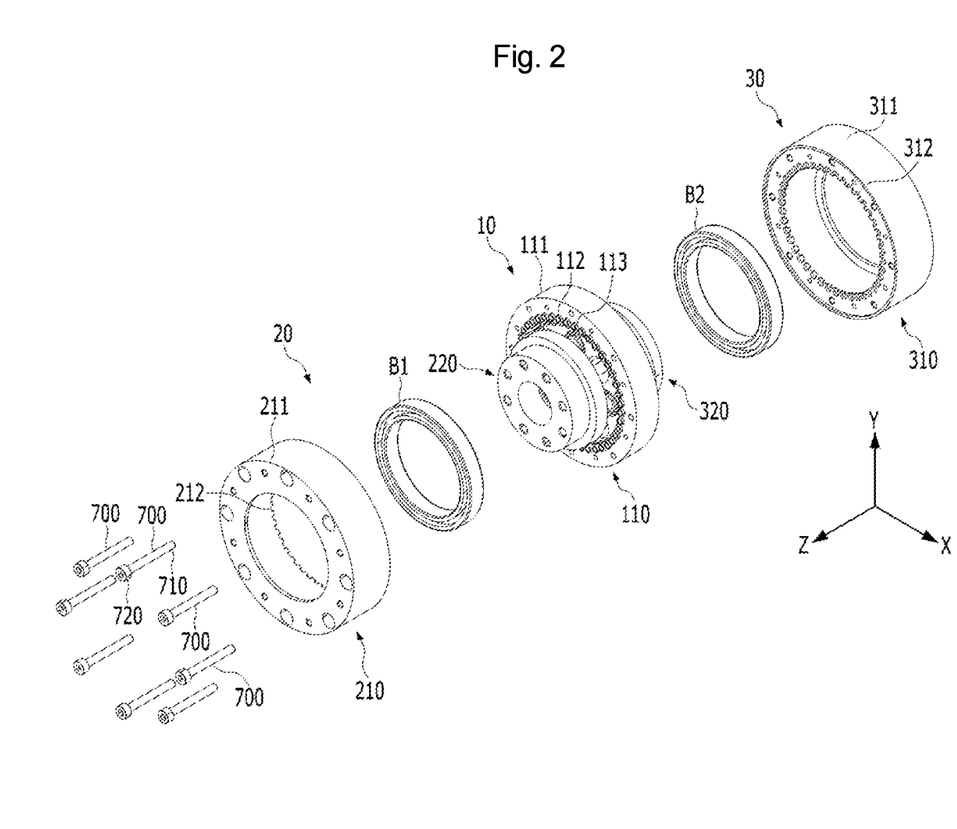
FIG. 2 is an exploded perspective view illustrating the reducer in FIG. 1.
Figure 3:
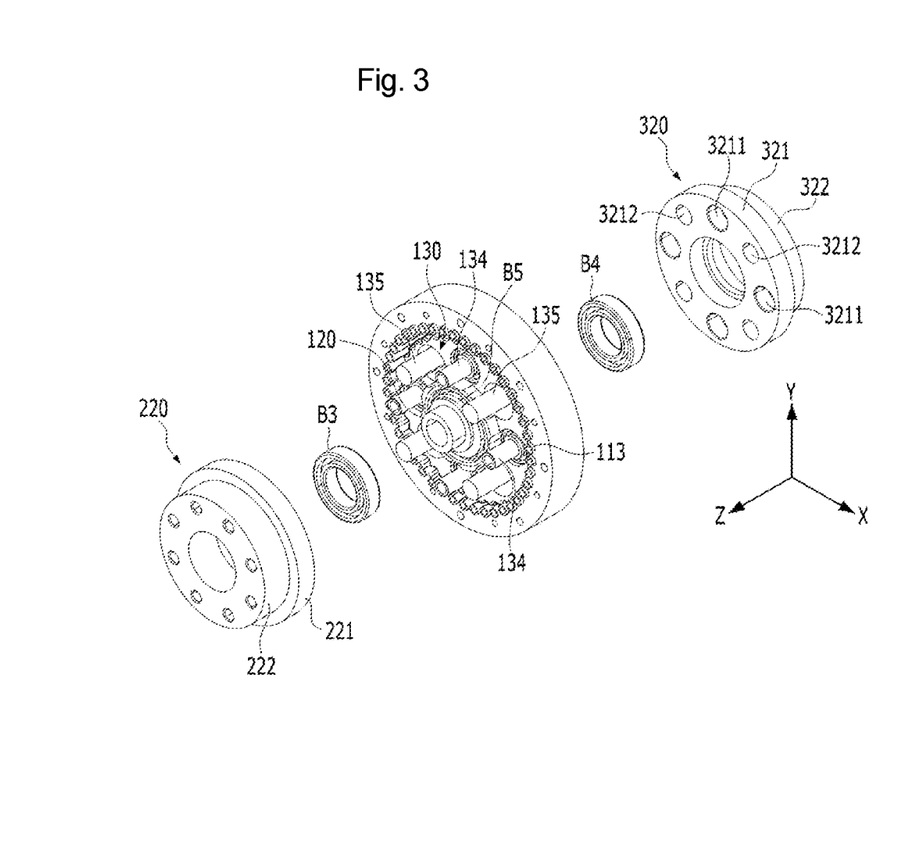
FIG. 3 is a view that is referred to for description of a reduction unit, an output rotor, and a balancing rotor of the reducer in FIG. 1.
Figure 4:
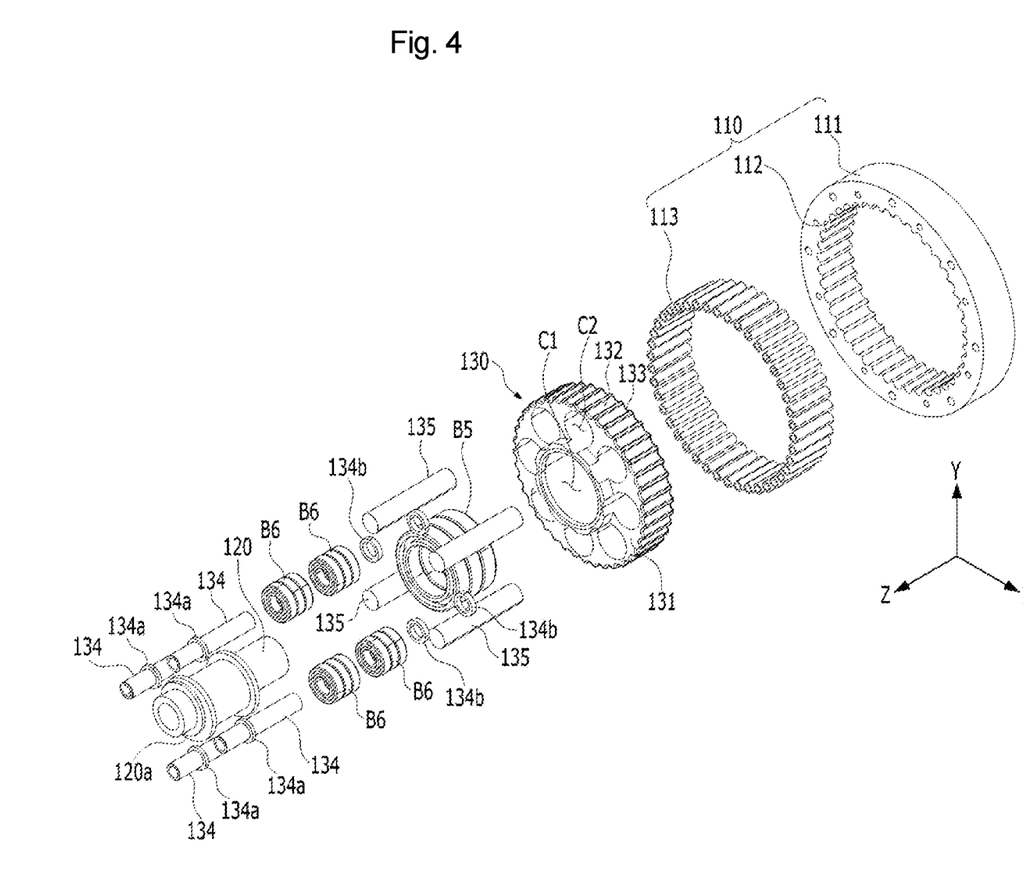
FIGS. 4 and 5 are exploded perspective views that are referred to for more detailed description of the reduction unit of the reducer in FIG. 1.
Figure 5:
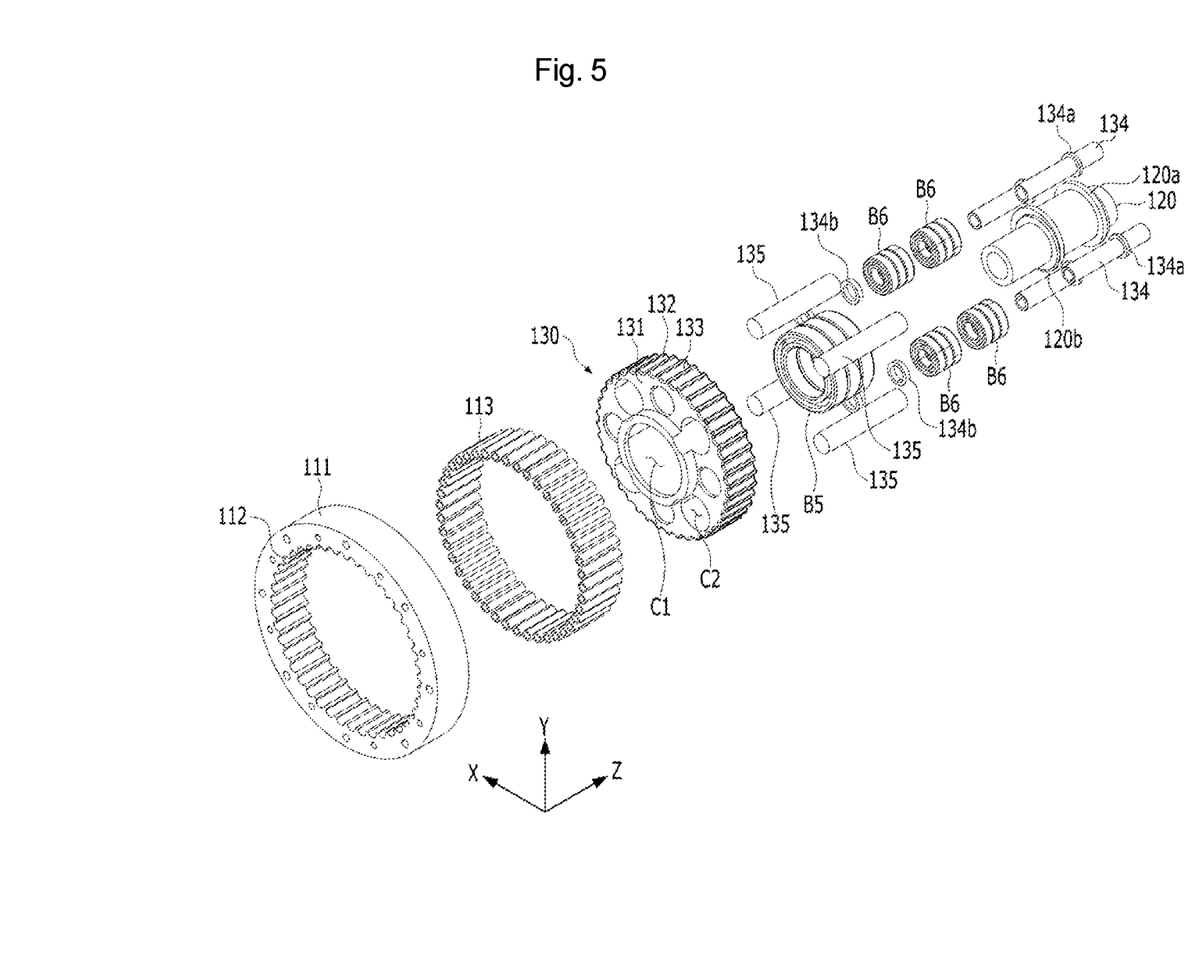
Figure 6:
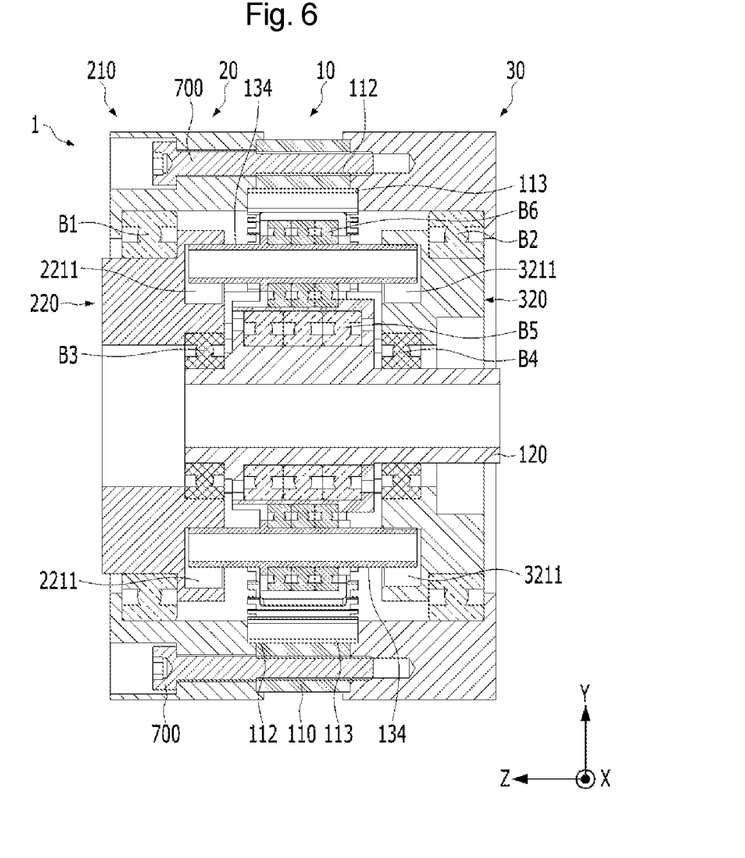
FIG. 6 is a cross-sectional view taken along line A-A' on FIG. 1.
Figure 7:
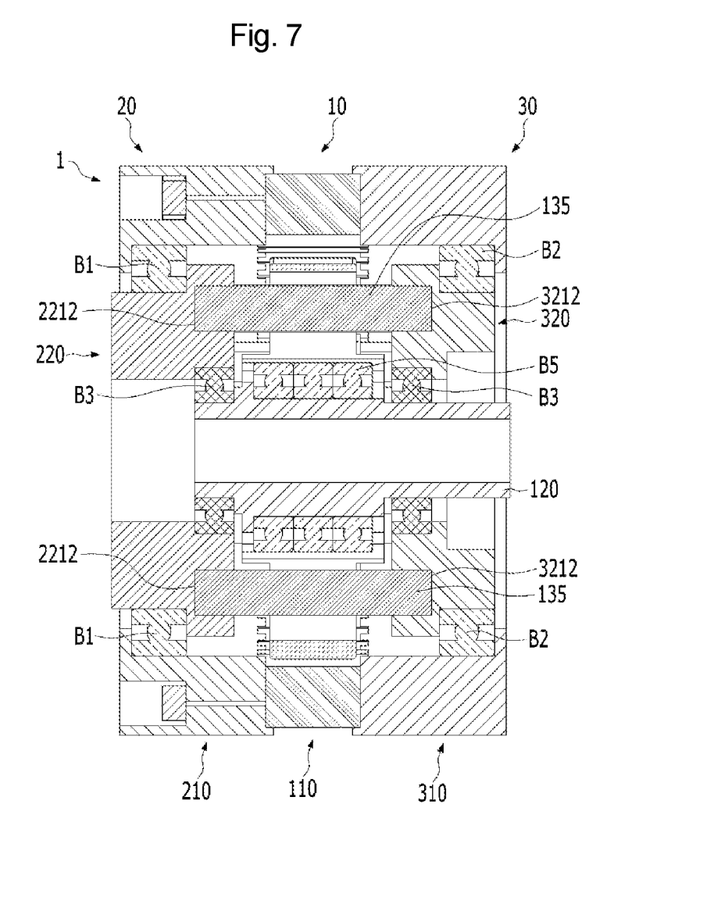
FIG. 7 is a cross-sectional view taken along line B-B' on FIG. 1.

FIG. 2 is an exploded perspective view illustrating the reducer 1 in FIG. 1. FIG. 3 is a view that is referred to for description of the reduction unit 10, an output rotor 220, and a balancing rotor 320 of the reducer 1 in FIG. 1. FIGS. 4 and 5 are exploded perspective views that are referred to for more detailed description of the reduction unit 10 of the reducer 1 in FIG. 1. FIG. 6 is a cross-sectional view taken along line A-A' on FIG. 1. FIG. 7 is a cross-sectional view taken along line B-B' on FIG. 1.

Referring to all FIGS. 2 to 7, the reduction unit 10 of the reducer 1 according to the first embodiment of the present disclosure includes a housing 110, an input shaft 120, and a cycloidal disc 130.

The housing 110 may be formed to have a hollow shape. As an example, the housing 110 may be formed in the shape of a hollow cylinder that is open at the rear side. The housing 110 in this shape has a housing sidewall 111 formed in the shape of a ring. A plurality of inner pin fixation grooves 112 are formed in an inner circumferential surface of the housing sidewall 111 along a circumference of the inner circumferential surface thereof. A plurality of inner pins 113 are arranged, in such a manner as to be spaced a predetermined distance apart from each other, in the plurality of inner pin fixation grooves 112, respectively, that are formed along the circumference of the inner circumferential surface. The inner pin 113 is engaged with the cycloidal disc 130, and thus the cycloidal disc 130 may be caused to be smoothly rotated.

The inner pin 113 is formed of an elastic material, and the inner pin 113 is formed to have a hollow structure. When the inner pin 113 is formed of an elastic material, the inner pin 113 is engaged with the cycloidal disc 130. Thus, the inner pin 113 stably supports a load transferred from the cycloidal disc 130. In addition, when formed to have a hollow structure, the inner pin 113 is elastically transformed with more ease through the hollow space. Therefore, the inner pin 113 may effectively support the load transferred from the cycloidal disc 130.

The input shaft 120 transfers the input torque to the reduction unit 10. The transferred input torque is reduced with an engagement between the cycloidal disc 130 that will be described below and the housing 110, and the reduction torque resulting from converting the input torque for reduction is transferred to the output unit 20.

Constituent elements of the cycloidal disc 130 will be described in detail below.

The reduction unit 10 of the reducer 1 according to the first embodiment of the present disclosure includes the cycloidal disc 130. The cycloidal disc 130 has a cycloidal disc main body 131 and a tooth-type protrusion 132 and 133 formed along a circumference of an edge of the cycloidal disc main body 131. More specifically, a plurality of tooth-type protrusions 132 and 133 have a structure that is formed by alternately arranging a plurality of protruding tooth-type protrusions 132 and a plurality of recessed tooth-type protrusion 133. At this point, the protruding tooth-type protrusion 132 may come into contact with the inner pin 113 formed on the inside of the housing 110, and the recessed tooth-type protrusion 133 may be formed in such a manner as to have a shape correspond to an outer circumferential surface of the inner pin 113.

In addition, the cycloidal disc 130 may have a first hollow space C1 formed in the center portion thereof in such a manner as to have an opening at both sides. The input shaft 120 described above may be inserted into the first hollow space C1 in the cycloidal disc 130 for being accommodated therein. In this case, the cycloidal disc 130 is coupled to an outer circumferential surface of the input shaft 120 in an eccentrically rotatable manner. Thus, with the eccentric rotation of the cycloidal disc 130 and an engagement between the tooth-type protrusion 132 and 133 and the inner pin 113, the input torque transferred from the input shaft 120 is reduced.

In addition, the cycloidal disc 130 may have a plurality of second hollow spaces C2 with the first hollow space C1 in the center. The second hollow spaces C2 may be formed to be spaced a predetermined angle apart from each other with respect to the first hollow space C1 in such a manner as to have an opening at both sides. As an example, eight second hollow spaces C2 may be formed to be spaced an angle of 45° apart from each other with respect to the first hollow space C1 in such a manner as to have an opening at both sides. However, the number of the second hollow spaces C2 is not limited to this example. According to the numbers of rolling pins 134 and fixation pins 135 and 136 that will be described, an appropriate number of the second hollow spaces C2 may be formed in such a manner as to have an opening at both sides.

The rolling pins 134 inserted into the cycloidal disc 130 for being coupled thereto will be described below.

The reducer 1 according to the first embodiment of the present disclosure includes a plurality of rolling pins 134 coupled to the cycloidal disc 130. The rolling pins 134 may each have a concentrically shaped cylindrical structure. The rolling pins 134 may be formed in such a manner as to extend over a predetermined distance from a disc surface of the cycloidal disc 130. More specifically, the rolling pins 134 may be inserted into at least several, respectively, of the second hollow spaces C2 in the cycloidal disc 130. Accordingly, the cycloidal disc 130 transfers the reduction torque, resulting from reduction due to the engagement between the tooth-type protrusion 132 and 133 and the inner pin 113, to the output unit 20 through the rolling pins 134.

The fixation pins 135 inserted into the cycloidal disc 130 for being coupled thereto will be described below.

The reducer 1 according to the first embodiment of the present disclosure may further include a plurality of fixation pins 135 coupled to the cycloidal disc 130. Like the rolling pins 134, the fixation pins 135 may have a cylindrical structure. In this case, the fixation pins 135 may be inserted into several other, respectively, of the second hollow spaces C2 in the cycloidal disc 130, into which the rolling pins 134 are not inserted. The fixation pins 125 serve to couple the output unit 20 and the balancing unit 30 to each other.

The rolling pins 134 and the fixation pins 135 are alternately inserted into the second hollow spaces C2. That is, when the rolling pin 134 is inserted into an arbitrary second hollow space C2, the fixation pin 135 is inserted into the second hollow space C2 adjacent to the arbitrary second hollow space C2 into which the rolling pin 134 is inserted. In the same manner, when the fixation pin 135 is inserted into an arbitrary second hollow space C2, the rolling pin 134 is inserted into the second hollow space C2 adjacent to the arbitrary second hollow space C2 into which the fixation pin 135 is inserted.

A configuration of the output unit 20 will be described in detail below.

The reducer 1 according to the first embodiment of the present disclosure includes the output unit 20. The output unit 20 is connected to a mechanism (not illustrated) that is a target for control and transfers the reduction torque to the outside.

The output unit 20 may include an auxiliary housing 210 to the side of the output unit 20. The auxiliary housing 210 to the side of the output unit 20 protects constituent elements mounted inside the housing 110 from the external environment. More specifically, the auxiliary housing 210 to the side of the output unit 20 may include an auxiliary housing main body 211 to the side of the output unit 20, which has the shape of a ring. The auxiliary housing main body 211 to the side of the output unit 20 may be formed in such a manner that an outer circumferential surface thereof has a greater diameter than an outer circumferential surface of the housing sidewall 111. The auxiliary housing 210 to the side of the output unit 20 may include an inner pin accommodation groove 212 to the side of the output unit 20, which is formed on one side of the auxiliary housing main body 211 to the side of the output unit 20. Depending on the situation, the inner pin 113 may have a length that is greater than a thickness of the housing sidewall 111 and may not be fully protected by the housing sidewall 111. In this case, first end portions of the inner pins 113 may be accommodated in the inner pin accommodation grooves 212 to the side of the output unit 20, respectively, which is formed in the auxiliary housing main body 211 to the side of the output unit 20, and thus, the inner pins 113 may be safely protected from the external environment.

In addition, the output unit 20 includes the output rotor 220 of which one portion is inserted into a hollow space in the auxiliary housing 210 to the side of the output unit 20. The output rotor 220 may accommodate the rolling pins 134 described above and may transfer the reduction torque transferred from the rolling pins 134 to the outside. The output rotor 220 has to accommodate the rolling pins 134 in order to transfer the reduction torque to the outside. In order to accommodate the rolling pins 134, the output rotor 220 includes a plurality of first rolling pin accommodation grooves 2211 that are formed by recessing one surface (more specifically, a surface corresponding to the rolling pin 134) thereof by a predetermined depth in a lengthwise direction of the rolling pins 134. The first rolling pin accommodation grooves 2211 may be formed in such a manner that positions thereof and the number thereof correspond to positions of the rolling pins 134 inserted into the cycloidal disc 130 and the number thereof, respectively. In this case, each of the plurality of first rolling pin accommodation grooves 2211 may be formed in such a manner as to have a greater diameter than each of the rolling pins 134. Therefore, the rolling pins 134 may be stably inserted into the first rolling pin accommodation grooves 2211, respectively.

In addition, in order for the output rotor 220 to accommodate the fixation pins 135, the output rotor 220 includes a plurality of first fixation pin accommodation grooves 2212 that are formed by recessing one surface (a surface corresponding to the fixation pin 135) thereof by a predetermined depth in a lengthwise direction of the fixation pins 135. The first fixation pin accommodation grooves 2212 may be formed in such a manner that positions thereof and the number thereof correspond to positions of the fixation pins 135 inserted into the cycloidal disc 130 and the number thereof, respectively. As an example, the rolling pins 134 and the fixation pins 135 are alternately inserted into the second hollow space C2 in the cycloidal disc 130. Therefore, the first rolling pin accommodation groove 2211 and the first fixation pin accommodation groove 2212 may also be alternately formed. Diameters of the first fixation pin accommodation grooves 2212 may correspond to diameters, respectively, of the fixation pins 135. More specifically, each of the first fixation pin accommodation grooves 2212 may have the same diameter as each of the fixation pins 135. As another example, a diameter of each of the first fixation pin accommodation grooves 2212 may have a minimum permissible tolerance with respect to a diameter of each of the fixation pins 135. Accordingly, the fixation pins 135 may be inserted into the first fixation pin accommodation grooves 2212, respectively, for being coupled thereto, and the fixation pins 135 coupled to the first fixation pin accommodation grooves 2212, respectively, are not rotated.

A configuration of the balancing unit 30 will be described in detail below.

The reducer 1 according to the first embodiment of the present disclosure may further include the balancing unit 30. The balancing unit 30 is formed in such a manner as to face the output unit 20 with the reduction unit 10 in between. The balancing unit 30 is formed in such a manner as to face the output unit 20 with the reduction unit 10 in between. Thus, the twisting moment that may occur when the reduction unit 10 and the output unit 20 operate may be canceled out (minimized).

The balancing unit 30 may include an auxiliary housing 310 to the side of the balancing unit 30. The auxiliary housing 310 to the side of the balancing unit 30 protects the constituent elements mounted inside the housing 110 from the external environment. More specifically, the auxiliary housing 310 to the side of the balancing unit 30 may include an auxiliary housing main body 311 to the side of the balancing unit 30, which has the shape of a ring. The auxiliary housing main body 311 to the side of the balancing unit 30 may be formed in such a manner that an outer circumferential surface thereof has a greater diameter than the housing sidewall 111. In addition, the auxiliary housing 310 to the side of the balancing unit 30 may include an inner pin accommodation groove 312 to the side of the balancing unit 30, which is formed in one side of the auxiliary housing main body 311 to the side of the balancing unit 30. Depending on the situation, the inner pin 113 may have a length that is greater than the thickness of the housing sidewall 111 and may not be fully protected by the housing sidewall 111. In this case, the second end portions of the inner pins 113 may be accommodated in the inner pin accommodation grooves 312 to the side of the balancing unit 30, respectively, which is formed in the auxiliary housing main body 311 to the side of the balancing unit 30, and thus the inner pins 113 may be safely protected from the external environment.

In addition, the balancing unit 30 includes the balancing rotor 320 of which one portion is inserted into a hollow space in the auxiliary housing 310 to the side of the balancing unit 30. The balancing rotor 320 may accommodate the rolling pins 134 described above and may be formed in such a manner that the balancing rotor 320 and the output rotor 220 are symmetrical. Thus, the twisting moment can be canceled out. The balancing rotor 320 has to accommodate the rolling pin 134 in order to cancel out the twisting moment. In order to accommodate the rolling pins 134, the balancing rotor 320 includes a plurality of second rolling pin accommodation grooves 3211 that are formed by recessing one surface (a surface corresponding to the rolling pin 134) thereof by a predetermined depth in the lengthwise direction of the rolling pins 134. The second rolling pin accommodation grooves 3211 may be formed in such a manner that positions thereof and the number thereof correspond to the positions of the rolling pins 134 inserted into the cycloidal disc 130 and the number thereof, respectively. In this case, each of the plurality of second rolling pin accommodation grooves 3211 may be formed in such a manner as to have a greater diameter than each of the rolling pins 134. Therefore, the rolling pins 134 may be stably inserted into the second rolling pin accommodation grooves 3211, respectively.

In addition, in order for the balancing rotor 320 to accommodate the fixation pins 135, the balancing rotor 320 includes a plurality of second fixation pin accommodation grooves 3212 that are formed by recessing one surface (the surface corresponding to the fixation pin 135) thereof by a predetermined depth in the lengthwise direction of the fixation pins 135. The second fixation pin accommodation grooves 3212 may be formed in such a manner that positions thereof and the number thereof correspond to the positions of the fixation pins 135 inserted into the cycloidal disc 130 and the number thereof, respectively. For example, the rolling pins 134 and the fixation pins 135 are alternately inserted into the second hollow space C2 in the cycloidal disc 130. Therefore, the second rolling pin accommodation groove 3211 and the second fixation pin accommodation groove 3212 may also be alternately formed. Diameters of the second fixation pin accommodation grooves 3212 may correspond to the diameters, respectively, of the fixation pins 135. More specifically, each of the second fixation pin accommodation grooves 3212 may have the same diameter as each of the fixation pins 135. As another example, a diameter of each of the second fixation pin accommodation grooves 3212 may have a minimum permissible tolerance with respect to the diameter of each of the fixation pins 135. Accordingly, the fixation pins 135 may be inserted into the second fixation pin accommodation grooves 3212, respectively, for being coupled thereto, and the fixation pins 135 coupled to the second fixation pin accommodation grooves 3212, respectively, are not rotated.

At this point, first end portions of the fixation pins 135 are coupled to the first fixation pin accommodation grooves 2212, respectively, in the output rotor 220 for being fixed thereto, and second end portions of the fixation pins 135 are coupled to the second fixation pin accommodation grooves 3212, respectively, in the balancing rotor 320 for being fixed thereto. Therefore, the output rotor 220 and the balancing rotor 320 are in a state of being coupled to the first end portions and the second end portions, respectively, of the fixation pins 135. Accordingly, the output rotor 220 and the balancing rotor 320 may be rotated together in conjunction with each other. The rotation of the output rotor 220 and the balancing rotor 320 together provides the advantage of minimizing the twisting moment possibly occurring on one side of the reducer 1 and possibly stably transferring the reduction torque to the outside.

Bearings arranged in the reducer 1 according to the first embodiment of the present disclosure will be described below.

The reducer 1 according to the first embodiment of the present disclosure includes a first bearing B1 (or a first load support bearing) and a second bearing B2 (or a second load support bearing). The first bearing B1 is arranged between an inner circumferential surface of the auxiliary housing 210 to the side of the output unit 20 and an outer circumferential surface of the output rotor 220. The second bearing B2 is arranged between an inner circumferential surface of the auxiliary housing 310 to the side of the balancing unit 30 and an outer circumferential surface of the balancing rotor 320. The first bearing B1 covers one portion of the outer circumferential surface of the output rotor 220. More specifically, the output rotor 220 may cover a first output rotor portion 221 and a second output rotor portion 222. The first output rotor portion 221 has a first outer diameter. The second output rotor portion 222 is formed in such a manner as to have a predetermined thickness and protrude from the first output rotor portion 221, and has a second outer diameter. The first bearing B1 may cover one portion of an outer circumferential surface of the second output rotor portion 222. Therefore, the first bearing B1 may reduce a friction between the inner circumferential surface of the auxiliary housing 210 to the side of the output unit 20 and the outer circumferential surface of the output rotor 220.

In the same manner, the second bearing B2 covers one portion of the outer circumferential surface of the balancing rotor 320. More specifically, the balancing rotor 320 may include a first balancing rotor portion 321 and a second balancing rotor portion 322. The first balancing rotor portion 321 has the first outer diameter. The second balancing rotor portion 322 has the second outer diameter when formed in such a manner as to have a predetermined thickness and protrude from the first balancing rotor portion 321. In addition, the second bearing B2 may cover one portion of an outer circumferential surface of the second balancing rotor portion 322. In this case, the first balancing rotor portion 321 and the second balancing rotor portion 322 are formed in such a manner that the first outer diameter is greater than the second outer diameter. Therefore, the second bearing B1 may reduce a friction between the inner circumferential surface of the auxiliary housing 310 to the side of the balancing unit 30 and the outer circumferential surface of the balancing rotor 320.

In addition, a third bearing ring B3 and a fourth bearing B4 that cover one portion of the outer circumferential surface of the input shaft 120 may be arranged. In this case, the third bearing ring B3 may be arranged between the outer circumferential surface of the input shaft 120 and an inner circumferential surface of a through-hole in the center of the first output rotor portion 221 of the output rotor 220 and thus may reduce a friction. The fourth bearing B4 may be arranged between the outer circumferential surface of the input shaft 120 and an inner circumferential surface of a through-hole in the center of the first balancing rotor portion 321 of the balancing rotor 320 and may reduce a friction.

In addition, a fifth bearing B5 covering one portion of an outer circumference surface of the input shaft 120 may be arranged. In this case, the fifth bearing B5 may be formed between the third bearing ring B3 and the fourth bearing B4. The fifth bearing B5 may be stably positioned at a regular position thereof by a first-side fifth bearing fixation portion 120a and a second-side fifth bearing fixation portion 120b that are formed to be coupled to the outer circumferential surface of the input shaft 120. The fifth bearing B5 may be arranged between the outer circumferential surface of the input shaft 120 and an inner circumferential surface of the first hollow space C1 in the cycloidal disc 130 and may reduce a friction.

In addition, a sixth bearing B6 covering one portion of an outer circumferential surface of each of the rolling pins 134 may be arranged. In this case, the sixth bearing B6 may be stably positioned at a regular position thereof by a first-side sixth bearing fixation portion 134a and a second-side sixth bearing fixation portion 134b that are formed to be coupled to outer circumferential surfaces of the rolling pins 134. The sixth bearing B6 may be arranged between an outer circumferential surface of the rolling pin 134 and an inner circumferential surface of the second hollow space C2 in the cycloidal disc 130 and may reduce a friction.

In this case, the rolling pins 134 may be concentrically rotated, by the sixth bearing B6, in the second hollow space C2. That is, the rolling pins 134 may be rotated according to rotation of the cycloidal disc 130. In this manner, the rolling pins 134 are concentrically coupled to the second hollow space C2 in the cycloidal disc 130 instead of being eccentrically coupled thereto. Thus, the ease of assembling of the reducer 1 can be improved, and the risk of failure can be decreased.

The rolling pins 134 may be eccentrically rotated relatively to the output rotor 220. That is, the rolling pins 134 may be concentrically rotated with respect to the cycloidal disc 130 and may be eccentrically moved relatively to the output rotor 220. Thus, the input torque can be converted into the reduction torque, and the reduction torque resulting from the conversion can be transferred to the output unit 20.

In addition, the fixation pins 135 connect the output rotor 220 and the balancing rotor 320 to each other. Accordingly, the fixation pins 135 may press against the output rotor 220 and the balancing rotor 320 toward the outside (the positive Z-axis direction and the negative Z-axis direction with respect to the cycloidal disc 130). At this point, by pressing against the output rotor 220 and the balancing rotor 320, the fixation pins 135 may pre-press against the first bearing B1 (the first load support bearing) covering one portion of the outer circumferential surface of the output rotor 220 and the second bearing B2 (the second load support bearing) covering one portion of the outer circumferential surface of the balancing rotor 320 toward the outward. The pre-pressing against of the first load support bearing B1 and the second load support bearing B2 toward the outside can make the first load support bearing B1 and the second load support bearing B2 positioned at the regular positions, respectively, thereof. Thus, the occurrence of vibration of the reducer 1, the inaccurate transfer of the reduction torque by the reducer 1, and the like, which are due to shaking of the first load support bearing B1 and the second load support bearing B2, are suppressed. Consequently, the reducer 1 according to the first embodiment of the present disclosure provides an advantage in that the pre-pressing against of the first load support bearing B1 and the second load support bearing B2 increases the durability and lifetime of the reducer 1. That is, the reducer 1 may maintain its stable assembled state. Furthermore, the reducer 1 may stably operate.

In addition, the reducer 1 according to the first embodiment of the present disclosure may further include a plurality of fastening means 700. Each of the plurality of fastening means 700 may include a fastening means main body 710 and a fastening means head 720. The fastening means 700 is illustrated as having the shape of a bolt, but is not necessarily limited to the shape of bolt. The fastening means 700 couples the output unit 20, the reduction unit 10, and the balancing unit 30 to each other, and keeps the reducer 1 in an assembled state.

A reducer 2 according to a second embodiment of the present disclosure will be described in detail below. A constituent element of the reducer 2 according to the second embodiment of the present disclosure that is the same as that of the reducer 1 according to the first embodiment of the present disclosure is briefly described, and a description thereof is omitted.

Figure 8:
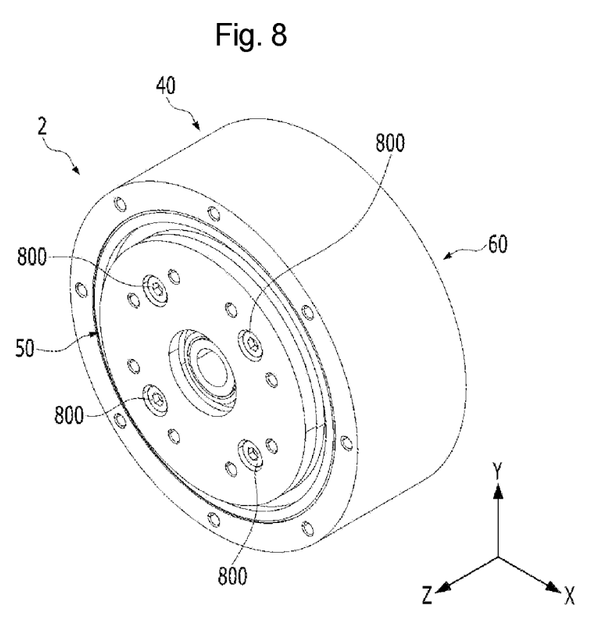
FIG. 8 is a view illustrating a reducer according to a second embodiment of the present disclosure.
Figure 9:
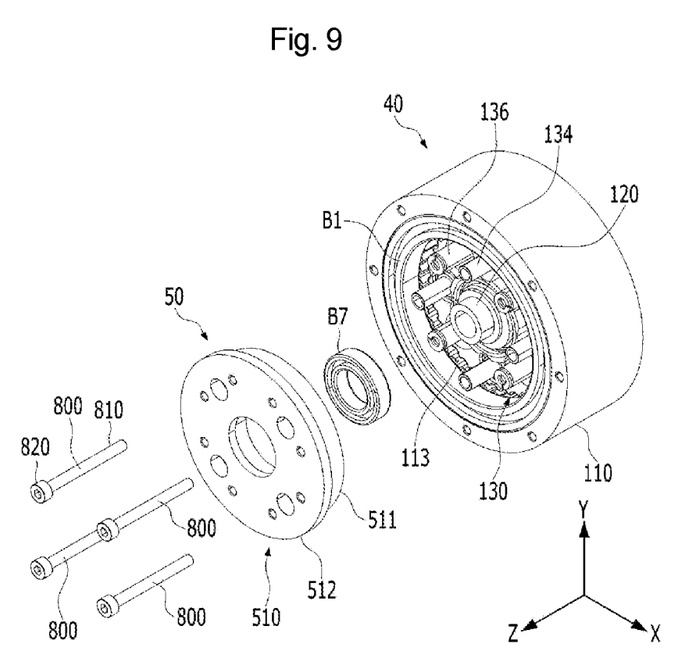
FIGS. 9 and 10 are exploded perspective views each illustrating one portion of the reducer in FIG. 8.
Figure 10:
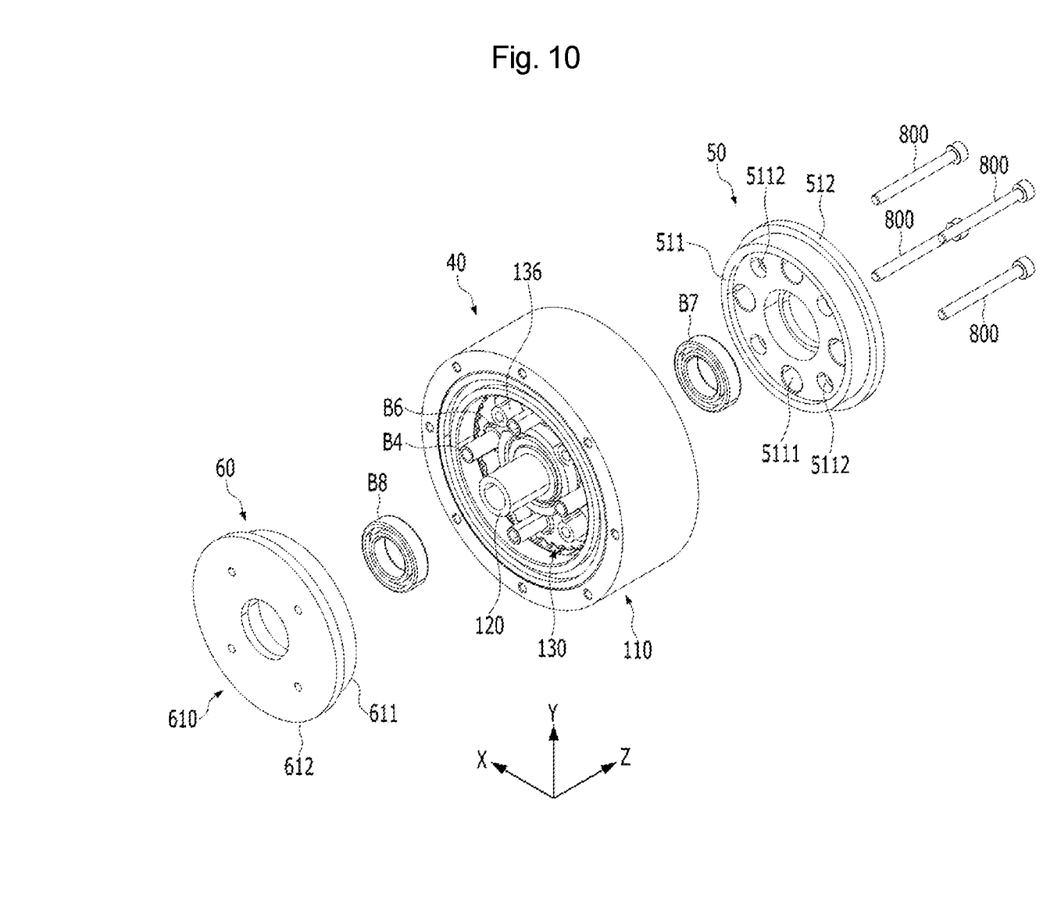

FIG. 8 is a view illustrating the reducer 2 according to the second embodiment of the present disclosure. FIGS. 9 and 10 are exploded perspective views each illustrating one portion of the reducer 2 in FIG. 8.

Referring to all FIGS. 8 to 10, the reducer 2 according to the second embodiment of present disclosure includes a reduction unit 40, an output unit 50, and a balancing unit 60. The reduction unit 40 reduces a toque being input from the input shaft 120, and the output unit 50 transfers the reduction torque resulting from reducing the input torque to the outside. The balancing unit 60 serves to minimize the twisting moment that may occur when the reduction unit 40 is coupled to the output unit 50.

The reducer 2 according to the second embodiment of the present disclosure may include the housing 110 that has a greater thickness than the housing 110 of the reducer 1 according to the first embodiment. In this case, a plurality of inner pins 113 are arranged into the inner pin fixation grooves 112, respectively, that are formed inside the housing 110, and the housing sidewall 111 itself stably protects the plurality of inner pins 113 from the outside environment.

The reducer 2 according to the second embodiment of the present disclosure includes an output rotor 510 and a balancing rotor 610 that are different in shape from those, respectively, of the reducer 1 according to the first embodiment of the present disclosure. The output rotor 510 may include a first output rotor portion 511 and a second output rotor portion 512. The first output rotor portion 511 has a third outer diameter. The second output rotor portion 512 is formed in such a manner as to have a predetermined thickness and protrude from the first output rotor portion 511, and has a fourth outer diameter. The first bearing B1 may cover one portion of an outer circumferential surface of the first output rotor portion 511. Therefore, the first bearing B1 may reduce a friction between the outer circumferential surface of the second output rotor portion 512 and the inner circumferential surface of the housing 110.

In the same manner, the balancing rotor 610 may include a first balancing rotor portion 611 and a second balancing rotor portion 612. The first balancing rotor portion 611 has the third outer diameter. The second balancing rotor portion 612 is formed in such a manner as to have a predetermined thickness and protrude the first balancing rotor portion 611, and has the fourth outer diameter. The second bearing B2 may cover one portion of an outer circumferential surface of the first balancing rotor portion 611. Therefore, the second bearing B2 may reduce a friction between the outer circumferential surface of the second balancing rotor portion 612 and the inner circumferential surface of the housing 110.

In the reducer 2 according to the second embodiment of the present disclosure, the output rotor 510 also includes a plurality of first rolling pin accommodation grooves 5111 and a plurality of first fixation pin accommodation grooves 5112. In the same manner, the balancing rotor 610 includes a plurality of second rolling pin accommodation grooves, which are formed by recessing the balancing rotor 610 by a predetermined depth in a lengthwise direction of the rolling pins 134, in order to accommodate the rolling pins 134, and a plurality of second fixation pin accommodation grooves, which are formed by recessing the balancing rotor 610 by a predetermined depth in a lengthwise direction of the fixation pins 136, in order to accommodate the fixation pins 136. The fixation pins 136 of the reducer 2 according to the second embodiment of the present disclosure may each have a hollow structure. Since the fixation pins 136 each has a hollow structure, a predetermined constituent element may be inserted into a hollow space inside the fixation pin 136 for being coupled thereto.

More specifically, the reducer 2 according to the second embodiment of the present disclosure includes a plurality of fastening means 800. The fastening means 800 includes a fastening means main body 810 and a fastening means head 820. In this case, an outer diameter of the fastening means main body 810 may correspond to an inner diameter of the fixation pin 136 having a hollow structure. That is, the fastening means main body 810 may be inserted into the fixation pin 136 for being coupled thereto, and the output rotor 510 and the balancing rotor 610 may be coupled to each other with the fastening means 800. Accordingly, the output rotor 510 and the balancing rotor 610 may be rotated together in conjunction with each other, and thus the twisting moment that may occur while the reduction torque is transferred to the outside through the output unit 50 may be canceled out.

In addition, the plurality of fastening means 800 may press against the output rotor 510 and the balancing rotor 610 toward the inside (in a direction from the output rotor 510 toward the cycloidal disc 130 and in a direction from the balancing rotor 610 toward the cycloidal disc 130). At this point, by pressing against the output rotor 510 and the balancing rotor 610, the plurality of fastening means 800 may pre-press against the first bearing B1 (the first load support bearing) covering one portion of the outer circumferential surface of the output rotor 510 and the second bearing B2 (the second load support bearing) covering one portion of an outer circumferential surface of the balancing rotor 610 toward the inside. The pre-pressing against of the first load support bearing B1 and the second load support bearing B2 toward the inside may make the first load support bearing B1 and the second load support bearing B2 positioned at the regular positions, respectively, thereof. Thus, the occurrence of vibration of the reducer 2, the inaccurate transfer of the reduction torque by the reducer 2, and the like, which are due to shaking of the first load support bearing B1 and the second load support bearing B2, are suppressed. Consequently, the reducer 2 according to the second embodiment of the present disclosure provides an advantage in that the pre-pressing against of the first load support bearing B1 and the second load support bearing B2 increases the durability and lifetime of the reducer 2. That is, the reducer 1 may maintain its stable assembled state. Furthermore, the reducer 1 may stably operate the reducer 1.

The technical idea of the present disclosure is described above only in an exemplary manner. It is apparent to a person of ordinary skill in the art to which the present disclosure pertains that various alterations and modifications are possibly made to the embodiments of the present disclosure without departing from the nature and gist of the present disclosure.

Therefore, the embodiments disclosed in the present disclosure are for describing, rather than limiting, the technical idea of the present disclosure and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure.

What is claimed is:

1. A reducer comprising:
   a reduction unit configured to reduce a speed of an input torque; and
   an output unit configured to be supplied with a preset reduction torque through the reduction unit and to transfer an output torque to the outside,
   wherein the reduction unit comprises:
     an input shaft configured to be supplied with the input torque;
     a cycloidal disc arranged on an outer circumferential surface of the input shaft in an eccentrically rotatable manner, a tooth-type protrusion being formed along a circumference of an edge of the cycloidal disc;
     a hollow housing configured to accommodate the cycloidal disc and including a plurality of inner pins arranged to be spaced a predetermined distance apart from each other along a circumference of an inner circumferential surface of the hollow housing in a manner that possibly comes into contact with the tooth-type protrusion on the cycloidal disc; and
     a plurality of rolling pins coupled to the cycloidal disc and having a cylindrical structure,
   wherein the output unit comprises:
     an output rotor configured to accommodate the rolling pins and to transfer the reduction torque transferred from the rolling pins to the outside; and
   wherein the rolling pins are eccentrically moved relatively to the output rotor,
   wherein the reducer further comprises:
     a balancing unit formed in such a manner as to face the output unit with the reduction unit in between and configured to cancel out a twisting moment of the reduction torque that occurs when the cycloidal disc is rotated,
   wherein the balancing unit comprises:
     a balancing rotor formed in such a manner as to face the output rotor and configured to accommodate the rolling pins,
   wherein the balancing rotor comprises:
     a plurality of second rolling pin accommodation grooves formed by recessing the balancing rotor by a predetermined depth in a lengthwise direction of the rolling pins in order to accommodate the rolling pins; and
     a plurality of second fixation pin accommodation grooves formed by recessing the balancing rotor by a predetermined depth in a lengthwise direction of the fixation pins in order to accommodate the fixation pins that each have a hollow structure,
   wherein the output rotor and the balancing rotor are coupled to each other by a plurality of fastening means which are inserted into the fixation pins, respectively, for being coupled thereto, and thus the output rotor and the balancing rotor are rotated together in conjunction with each other.

2. The reducer of claim 1, wherein the rolling pins are rotated according to rotation of the cycloidal disc.

3. The reducer of claim 1, wherein the cycloidal disc comprises:
   a first hollow space formed at the center of the cycloidal disc in such a manner as to have a through hole to accommodate the input shaft; and
   a plurality of second hollow spaces formed to be arranged with a predetermined angle around the first hollow space so that each of the plurality of second hollow spaces comprises a through hole, respectively,
   wherein the rolling pins are inserted into at least some, respectively, of the second hollow spaces.

4. The reducer of claim 3, further comprising:
   a plurality of fixation pins inserted into several other, respectively, of the second hollow spaces into which the rolling pins are not inserted.

5. The reducer of claim 4, wherein the rolling pins and the fixation pins are alternately inserted into the second hollow spaces.

6. The reducer of claim 4, wherein the output rotor comprises:
   a plurality of first rolling pin accommodation grooves formed by recessing the output rotor by a predetermined depth in a lengthwise direction of the rolling pins in order to accommodate the rolling pins; and
   a plurality of first fixation pin accommodation grooves formed by recessing the output rotor by a predetermined depth in a lengthwise direction of the fixation pins in order to accommodate the fixation pins, wherein each of the first fixation pin accommodation grooves has a diameter corresponding to a diameter of each of the fixation pins.

7. The reducer of claim 1, wherein the balancing rotor comprises:

a plurality of second rolling pin accommodation grooves formed by recessing the balancing rotor by a predetermined depth in a lengthwise direction of the rolling pins in order to accommodate the rolling pins; and a plurality of second fixation pin accommodation grooves formed by recessing the balancing rotor by a predetermined depth in a lengthwise direction of the fixation pins in order to accommodate the fixation pins, wherein the output rotor and the balancing rotor are coupled to first end portions and second end portions, respectively, of the fixation pins, and thus the output rotor and the balancing rotor are rotated together in conjunction with each other.

8. The reducer of claim 1, wherein the plurality of fastening means press against the output rotor and the balancing rotor toward the inside, thereby pre-pressing against a first load support bearing configured to cover one portion of an outer circumferential surface of the output rotor and a second load support bearing configured to cover one portion of an outer circumferential surface of the balancing rotor toward the inside.

\* \* \* \* \*